United States Patent [19]

Devereaux et al.

[11] Patent Number: 4,920,688
[45] Date of Patent: * May 1, 1990

[54] SWIVEL JIG FISHING LURE

[75] Inventors: Chuck Devereaux, Stratford; Joe D. Craig, Moore, both of Okla.

[73] Assignee: Hart Tackle Company, Inc., Stratford, Okla.

[*] Notice: The portion of the term of this patent subsequent to Jun. 21, 2005 has been disclaimed.

[21] Appl. No.: 199,530

[22] Filed: May 27, 1988

Related U.S. Application Data

[63] Continuation-in-part of Ser. No. 931,200, Nov. 17, 1986, Pat. No. 4,751,789.

[51] Int. Cl.⁵ .............................................. A01K 85/00
[52] U.S. Cl. .................................. 43/42.39; 43/42.28
[58] Field of Search .................. 43/42.39, 42.1, 42.24, 43/42.28

[56] References Cited

U.S. PATENT DOCUMENTS

| | | | |
|---|---|---|---|
| Des. 158,854 | 6/1950 | Harvey | D 31/4 |
| 1,612,264 | 12/1926 | Cressey | 43/42.28 |
| 1,801,940 | 4/1931 | Stanley | 43/42.28 |
| 1,897,291 | 2/1933 | Andrews | 43/43.1 |
| 2,111,020 | 3/1938 | Arbogast | 43/42.28 |
| 2,295,765 | 9/1942 | Weber | 43/48 |
| 2,315,304 | 3/1943 | Upperman | 43/42.28 |
| 2,510,769 | 6/1950 | Berry | 43/42.28 |
| 2,938,293 | 5/1960 | Richardson | 43/42.24 |
| 2,955,378 | 10/1960 | Burke | 43/42.28 |
| 3,037,316 | 6/1962 | DeZeeuw | 43/42.28 |
| 3,803,747 | 4/1974 | Cartwright | 43/42.28 |
| 4,414,772 | 11/1983 | Duncan | 43/42.36 |
| 4,619,069 | 10/1986 | Strickland | 43/42.28 |

Primary Examiner—Nicholas P. Godici
Assistant Examiner—Carmine Cuda
Attorney, Agent, or Firm—Laney, Dougherty, Hessin & Beavers

[57] ABSTRACT

A swivel jig fishing lure which includes a hard body having a protuberant, rounded lobe disposed on the bottom side of the body and having a rounded nose at the forward end thereof. The central part of the body, to which the downwardly extending lobe is affixed, tapers rearwardly through a reduced diameter neck portion of the body, and merges into a flared tail portion. The body carries a retrieving line eye at the upper side of the forward end thereof, and an eye for attaching a hook at the opposite side of the artificial lure. A buck tail is secured around the body at the neck portion thereof by means of an elastomeric band.

3 Claims, 1 Drawing Sheet

U.S. Patent | May 1, 1990 | 4,920,688
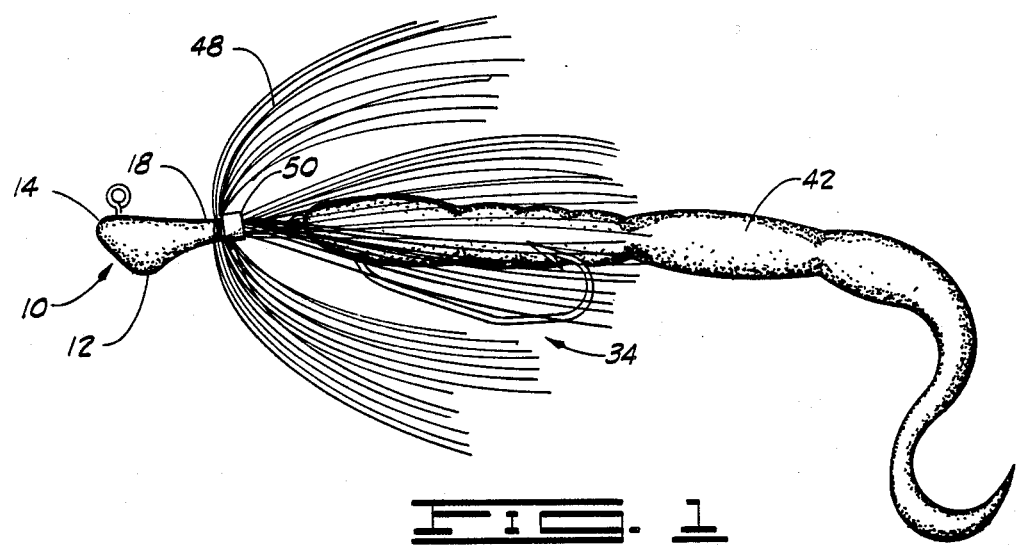
FIG. 1
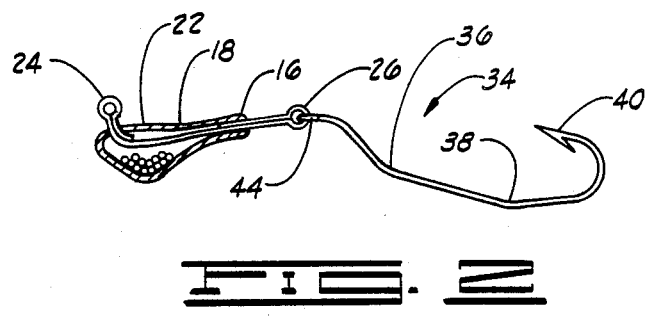
FIG. 2
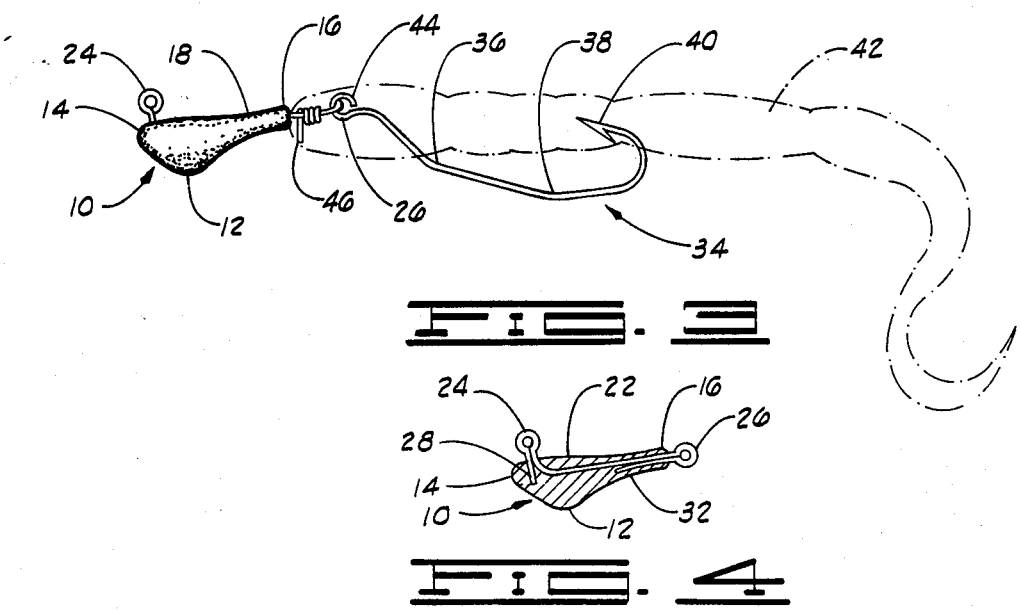
FIG. 3
FIG. 4

SWIVEL JIG FISHING LURE

RELATED APPLICATION

This application is a continuation-in-part of our U.S. patent application Ser. No. 931,200, filed on Nov. 17, 1986, and issuing to U.S. Pat. No. 4,751,789 on June 21, 1988.

BACKGROUND OF THE INVENTION

1. Field of the Invention

This invention relates to fishing lures, and more particularly, to jig-type fishing lures.

2. Brief Description of the Prior Art

Many types of fishing lure jigs have been heretofore proposed, and a number of these have a relatively heavy or dense body portion which acts as a stabilizing weight, and also acts as an anchor point for the eye to which the retrieving line is secured. A second eye secured to the body portion functions as a swivel situs to which a hook is swivelly connected. Some jigs of this type also have buck tails or skirts attached to the lure body for the purpose of disguising the hook, and/or attracting fish to the lure.

Upperman U.S. Pat. No. 2,315,304 depicts and describes a fishing lure which has a buck tail secured by strands of wire filament to the after portion of a hard rigid body. The buck tail functions to partially disguise a conventional or standard fishing hook which is rigidly attached to the body and cannot swivel. One end of the fishing hook forms an eye by which a retrieving line can be attached to the lure. This lure does not resemble the present invention in its design or function, except in the broadest terms.

In Creasy U.S. Pat. No. 1,612,264, the trolling spoon there shown includes a skirt forming a screen of fronds or feathers which partially disguise a hook. The feathers or fronds are secured by a ring around the after portion of the lure body.

In De Zeeuw U.S. Pat. No. 3,037,316, the fishing jig there shown includes a body having a swedged and downwardly protuberant belly, and has a retrieving line eye secured to the upper forward end of the body upon which the belly is formed. The rear or after part of the lure body has an elongated worm secured around the body by means of a wrap of wire or filament, and this worm is impaled upon a hook 24 and extends rearwardly from the hook.

Duncan U.S. Pat. No. 4,414,772, depicts and describes a top water fishing lure which has a rigid body having an elongated, relatively small diameter tail portion, and a protuberant belly portion closer to the forward end of the lure body. An eye for the attachment of a retrieving line to the lure is secured to the upper, forward portion of the body. A flexible, resilient elongated tail, which is twisted so that it will undergo a whipping motion during retrieve, is secured around the rear portion of the lure body, and functions to partially disguise a hook which is rigidly secured to the rear of the rigid lure body. Instead of the elongated worm element, a plastic skirt made up of a plurality of fronds or filaments can be utilized for securing the forward end of the skirt or its waist portion around the lure body near the rear end thereof.

Arbogast U.S. Pat. No. 2,111,020, discloses an artificial fishing bait which includes a buck tail or skirt secured to a protuberant portion at the rear end of a hard body part of the lure. The body includes a protuberant belly which projects downwardly, and which has secured, to one side thereof, an eye by which a retrieving line can be swivelly connected to the forward end of the lure body. A hook projects into the rear end of the body portion, and is hidden by being located within the fronds of the skirt.

A fishing lure having a body shape slightly resembling the body of the lure of the present invention is the lure shown in Berry U.S. Pat. No. 2,510,769. The body portion of the Berry fishing lure is cut away so that it has a forwardly facing surface which projects at an acute angle to the longitudinal axis of the lure.

Other U.S. Patents disclosing lures with trailing elements of the general type described are depicted in Stanley U.S. Pat. No. 1,801,940, Weber U.S. Pat. No. 2,295,765, Richardson U.S. Pat. No. 2,938,293 and Harvey U.S. Design Patent DES.-158,854.

BRIEF DESCRIPTION OF THE PRESENT INVENTION

The present invention constitues an improvement over the swivel jig fishing lure shown in our U.S. Pat. No. 4,751,789 issued on June 21, 1988. The lure of the present invention is improved over that shown in our cited patent, in that the economics of manufacture of the present invention are more favorable. Moreover, the effective operating life of the lure without malfunction is extended by providing a certain wire construction by which rings or eyes are provided at the forward end and the rear end of the lure body in a way which assures their permanency and proper orientation. Moreover, the method of securement of the buck tail to the lure body, where such is used, is also improved with respect to the invention shown in the prior patent.

Broadly described, the lure of the present invention includes a hard lure body which has a protuberant lobe on the lower side thereof and a rounded nose at the forward side thereof. A wire is bent so as to form a first eye at the upper forward side of the lure body, and a second eye at the rear side thereof for attachment of a hook to the lure body. After bending the eyes from the wire, a pair of divergent legs are provided at the forward end and rear end of the wire adjacent the eyes which are formed in the wire. These divergent legs, in being angled with respect to the main or central portion of the wire, with such angulation occurring within the lure body, assures that the eyes will remain in a fixed position relative to the body, and will not swivel or easily break off, and that their mechanical strength will be substantially enhanced.

The body of the lure characteristically has a reduced neck portion to which a buck tail or skirt is attached by means of an annular collar or ring which holds the buck tail closely around the neck portion of the lure body.

An important object of the present invention is to provide an improved swivel jig fishing lure which is more ruggedly constructed and is characterized as having an improved trouble free service life.

Additional objects and advantages will be come apparent as the following detailed description of the invention is read in conjunction with the accompanying drawings which illustrate preferred embodiments of the invention.

BRIEF DESCRIPTION OF THE DRAWINGS

FIG. 1 is a side elevation view of a swivel jig fishing lure constructed in accordance with the present invention.

FIG. 2 is a side view partly in section and partly in elevation illustrating a part of the lure shown in FIG. 1.

FIG. 3 depicts a modified embodiment of a part of the lure of the invention.

FIG. 4 is a sectional view through a modified and preferred construction of the lure of the invention.

DETAILED DESCRIPTION OF A PREFERRED EMBODIMENT OF THE INVENTION

As shown in FIG. 1, the lure includes a rigid body, designated generally by reference numeral 10. The body portion includes a protuberant, rounded lobe 12 on the lower side thereof and a rounded nose portion 14 at the forward side of the body. A rear end portion 16 of the body is joined to the forward part of the body by a neck 18 which is the narrowest portion of the body. The body 10 may be made hollow, as shown in FIG. 2, or, in a preferred embodiment of the invention, is molded as a solid body as shown in FIG. 3. Where the body is constructed in a hollow form, it is made to contain a plurality of sound generating shot or beads as shown in FIG. 2.

A metallic wire element 22 is bent so as to form an eye 24 at the forward, upper side of the body for the attachment of a retrieving line, and a second eye 26 at the rear of the body for the purpose of engagement of a hook. The wire is preferably bent so that a leg 28 spreads apart from the principle elongated central portion of the wire in the forward end of the body at an acute angle of from about 10° to about 35°, and a second leg 32 is spread apart from the principle central portion of the wire within the rear end of the body with the diverging being at about the same angle. This configuration is shown in FIG. 4 and is developed where the body is solid. This configuration is to be preferred over that which is illustrated in FIG. 2 where it will be perceived that the bent back portion of the wire lies relatively closely adjacent the central portion of the wire.

A hook 34 is attached to the eye 26 formed at the rear of the body portion as shown in FIGS. 2 and 3. The hook 34 is angulated at the places shown so that an obtuse angle 36 is located near the eye-carrying end of the hook, and a second obtuse angle 38 is formed at a bend occurring relatively near to the forward, barb-carrying end of the hook. These obtuse angles are of from about 150° to about 170° in size. The barb 40 is used for impaling a plastic worm 42 or other simulated natural bait species. An eye 44 at the forward end of the hook 34 is used for attaching or securing the hook to the corresponding eye 26 formed at, and positioned near, the rear end of the body portion 10 of the lure.

The worm 42 is mounted in the position shown in FIGS. 1 and 3 (other synthetic structures simulating a natural bait species other than a worm can be used). The worm is impaled at its forward end on a free end portion 46 of the wire 22 in one embodiment of the invention (as shown in FIGS. 3), but in all embodiments of the invention, is impaled about one-third of the way along its total length by passing the barb 40 of the hook into the body of the plastic worm.

A preferred embodiment of the lure is completed by affixing a buck tail or skirt 48 thereto, using a constricting rubber band or collar 50, as shown in FIG. 1. The rubber band or collar 50 is placed around strands of the back tail at the location of the neck 18 of the body 10, since the neck is the place along the body where the body is narrowest or of least diameter. Stated differently, the body at both of the opposite sides of the neck portion 18 flares outwardly and this aids in retaining the buck tail or skirt in position on the body by the use of the elastomeric band or collar 50.

Although certain preferred embodiments of the present invention have been herein illustrated and described in order to elucidate the principles of the invention, it will be understood that various changes and modifications can be effected in the illustrated structure without departure from the basic principles of the invention. Changes and innovations of this type are deemed to be circumscribed by the spirit and scope of the invention, except as the same may be necessarily limited by the appended claims or reasonable equivalents thereof.

What is claimed is:

1. A swivel jig fishing pure comprising:
   a hard body which has a forward end and a rear end and which includes:
      a protuberant lobe on the lower side thereof;
      a rounded nose portion at the upper side of the forward end thereof;
      a rear end portion; and
      a neck portion between said lobe and said rear end portion;
   a continuous wire extending through said hard body and including:
      a forward eye disposed immediately above the nose portion of the body for the engagement of a retrieving line;
      a rear eye projecting rearwardly from the rear end portion of the body;
      a central portion extending between the forward eye and the rear eye from one end of the body to the other end thereof;
      a first, forward leg connected to and extending from said forward eye into the body, and diverging from, and extending at an acute angle to, said central portion of said wire; and
      a second, rear leg connected to and extending from said rear eye into the body and diverging from, and extending at an acute angle to, said central portion of said wire;
   a hook movably connected to rear eye; and
   a resilient flexible artificial bait species having a portion threaded over the connection between the hook and the rear eye, and further having a portion impaled by the barb of the hook.

2. A swivel jig fishing lure as defined in claim 1 and further characterized as including:
   a multiple frond buck tail skirt; and
   an annular collar extending around the neck portion of said body and retaining said skirt on said body with said fronds of the skirt positioned to cover said hook when said lure is streaming during retrieve.

3. A swivel jig fishing lure comprising:
   a hard body which has a forward end and a rear end and which includes:
      a protuberant lobe on the lower side thereof;
      a rounded nose portion at the upper side of the forward end thereof;
      a rear end portion; and
      a neck portion between said lobe and said rear end portion;

a continuous wire extending through said hard body and including:
- a forward eye disposed immediately above the nose portion of the body for the engagement of a retrieving line;
- a rear eye projecting rearwardly from the rear end portion of the body;
- a central portion extending between the forward eye and the rear eye from one end of the body to the other end thereof;

a hook movably connected to said rear eye and including:
- a barb at one end of the hook;
- a hook eye at the end of the hook opposite the barb and engaging said rear eye of the wire which extends through the body; and
- a hook shank interconnecting said barb and said hook eye and bent at two spaced points therealong so as to define an obtuse angle of from about 150° to about 170° at each of said bends;

a resilient, flexible elongated artificial bait species having a forward portion threaded over the hook eye and the rear eye of the wire, and having a portion impaled on said hook barb; and a buck tail having a plurality of flexible fronds and connected to position said fronds around at least a portion of said hook.

* * * * *

UNITED STATES PATENT AND TRADEMARK OFFICE
CERTIFICATE OF CORRECTION

PATENT NO. : 4,920,688

DATED : May 1, 1990

INVENTOR(S) : Chuck Devereaux and Joe Dale Craig

It is certified that error appears in the above-identified patent and that said Letters Patent is hereby corrected as shown below:

In the Specification:
In Column 1, line 36, delete "Creasy" and insert --Cressey--.

In the Claims:
In Column 4, line 20, delete "pure" and insert --lure--.

Signed and Sealed this

Third Day of September, 1991

Attest:

HARRY F. MANBECK, JR.

*Attesting Officer*     *Commissioner of Patents and Trademarks*